UNITED STATES PATENT OFFICE.

CHARLES E. GRIFFING, OF LOS ANGELES, CALIFORNIA.

EXPLOSIVE.

991,057.

No Drawing.

Specification of Letters Patent. Patented May 2, 1911.

Application filed December 6, 1910. Serial No. 595,973.

*To all whom it may concern:*

Be it known that I, CHARLES E. GRIFFING, a citizen of the United States, residing at Los Angeles, in the county of Los Angeles and State of California, have invented certain new and useful Improvements in Explosives, of which the following is a specification.

The purpose of my invention is to provide an explosive which is easily and cheaply manufactured and without costly or expensive machinery, and one that may be manufactured and handled without danger of explosion, and one that will retain its strength for any length of time if kept dry. These objects I accomplish by the proportionate mixture of the following ingredients.

I use granulated sugar 25%, and enough water to dissolve it. This mixture is boiled until it forms a syrup which will harden when cooled. Then remove from the heat and stir into this syrup powdered chlorate of potash 30%. When the mass is stirred until it is of the consistency of soft putty it is granulated by rubbing it through a screen having a mesh of the size of the grains desired in the finished product. When thoroughly dried, mix with this granulated mass, the following powdered ingredients: charcoal 15%, black dioxid of manganese 15%, sugar of milk 5%, and zinc dust 10%. The zinc dust is sometimes called zinc fumes and is largely produced at zinc smelters.

This explosive may be fired by an electric battery or the common fuse without using a cap, and its explosive force is the greatest in an upward and outward direction.

Having thus described my invention I desire to secure by Letters Patent and claim:

1. An explosive consisting of a granulated mixture of sugar 25%, and chlorate of potash 30%, mixed with powdered charcoal 15%, black dioxid of manganese 15%, sugar of milk 5% and zinc dust 10%.

2. An explosive consisting of a granulated mixture of sugar 25%, and powdered chlorate of potash 30%, mixed with powdered charcoal 15%, black dioxid of manganese 15%, sugar of milk 5%, and zinc flue dust 10%.

In testimony whereof I have affixed my signature in presence of two witnesses.

CHARLES E. GRIFFING.

Witnesses:
 M. McCULLEN,
 DAISY LEE.